Sept. 19, 1933. F. O'NEILL, JR., ET AL 1,927,183
METHOD OF MANUFACTURING WIRE PULL BOTTLE CAPS
Filed April 18, 1932 4 Sheets-Sheet 1
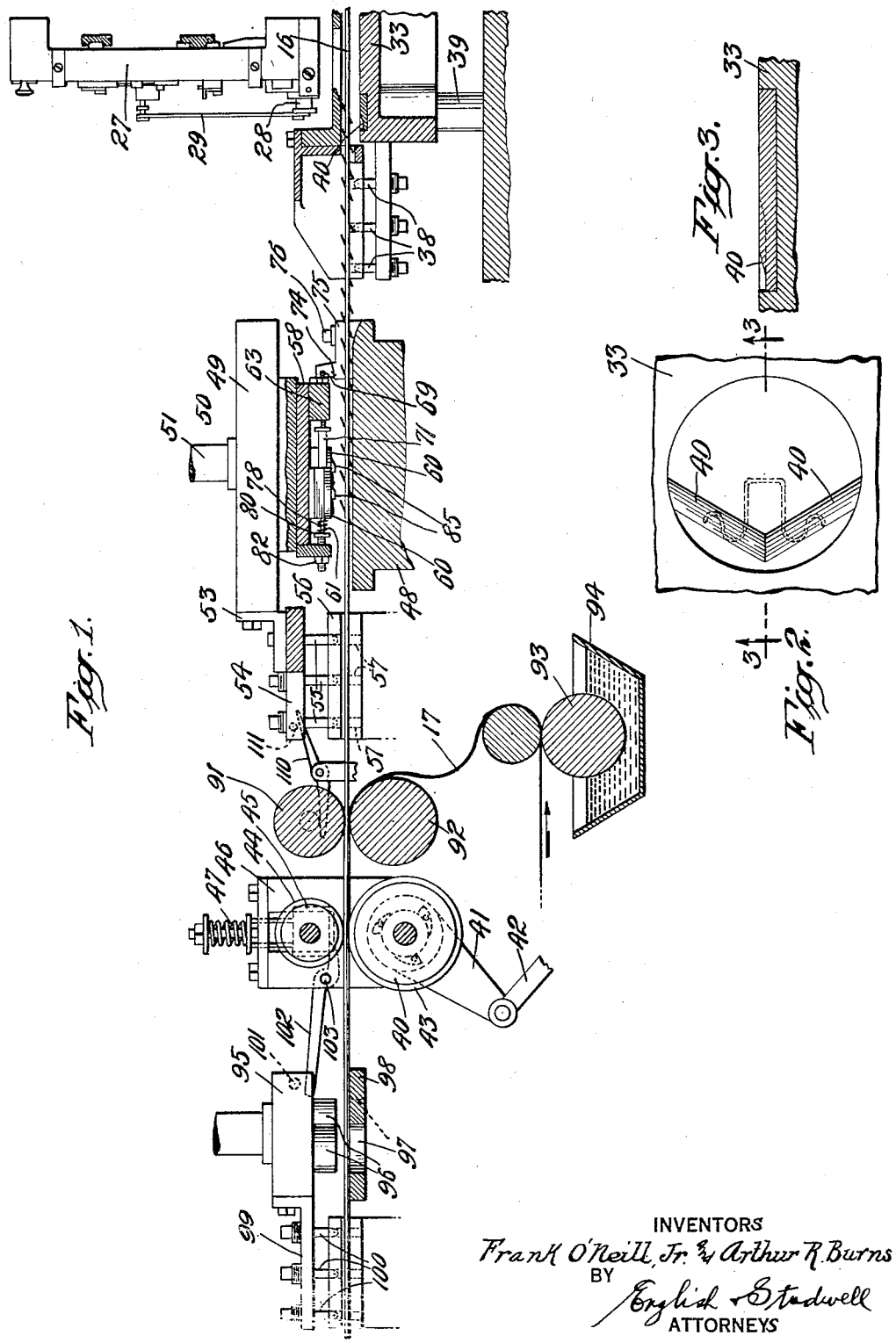
INVENTORS
Frank O'Neill, Jr. & Arthur R. Burns
BY
English & Stidwell
ATTORNEYS

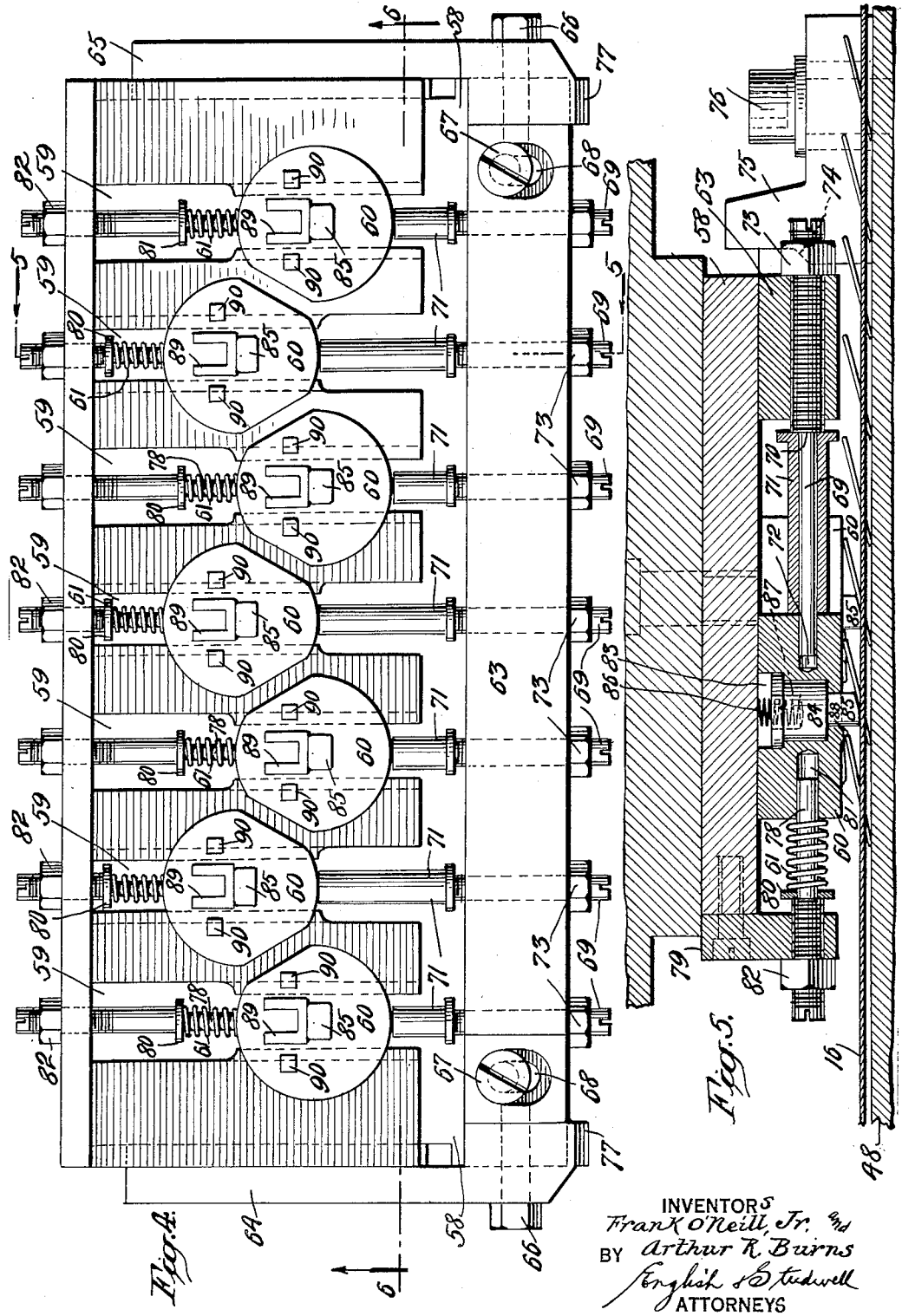

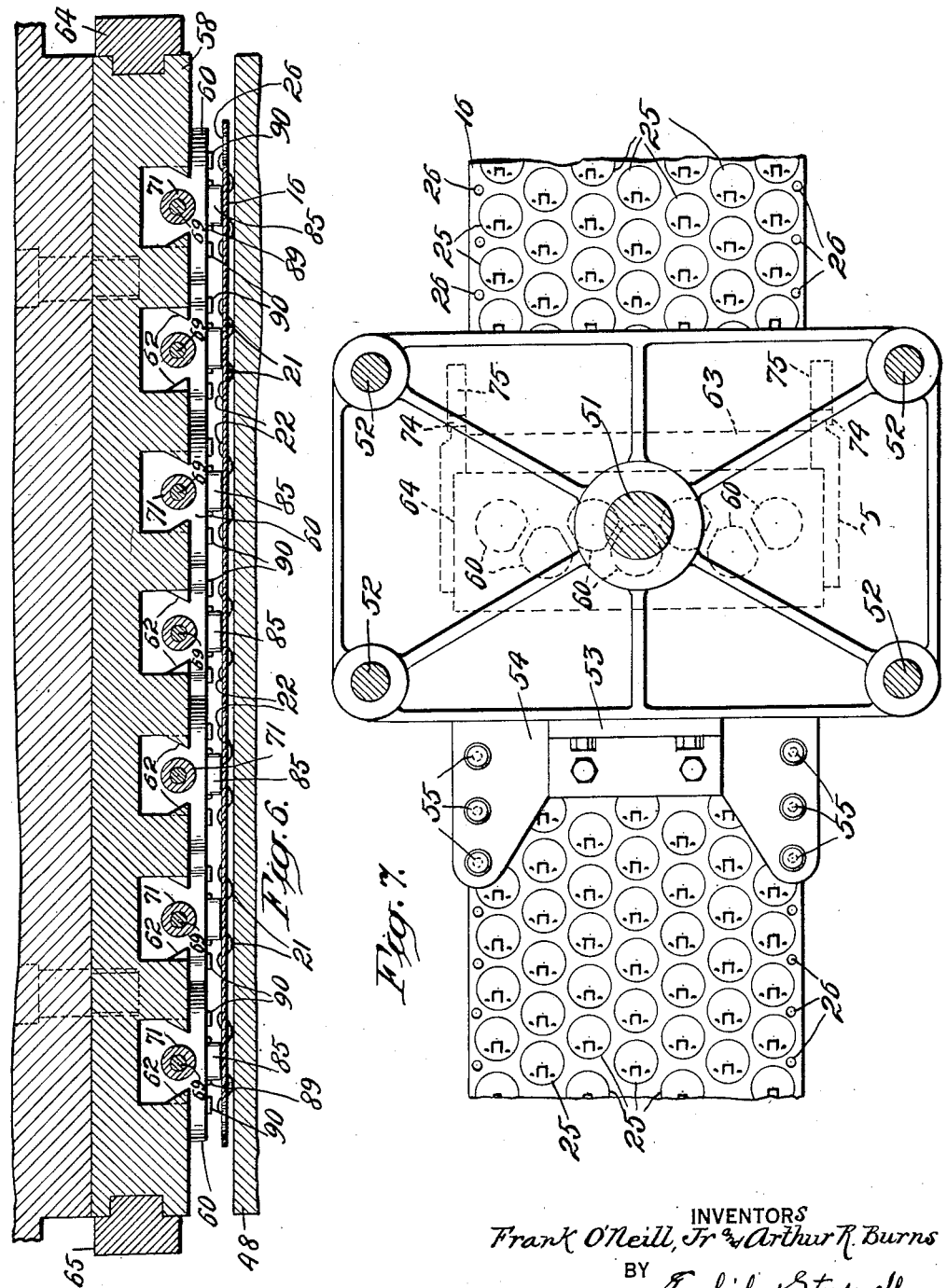

Sept. 19, 1933.   F. O'NEILL, JR., ET AL   1,927,183
METHOD OF MANUFACTURING WIRE PULL BOTTLE CAPS
Filed April 18, 1932    4 Sheets-Sheet 4
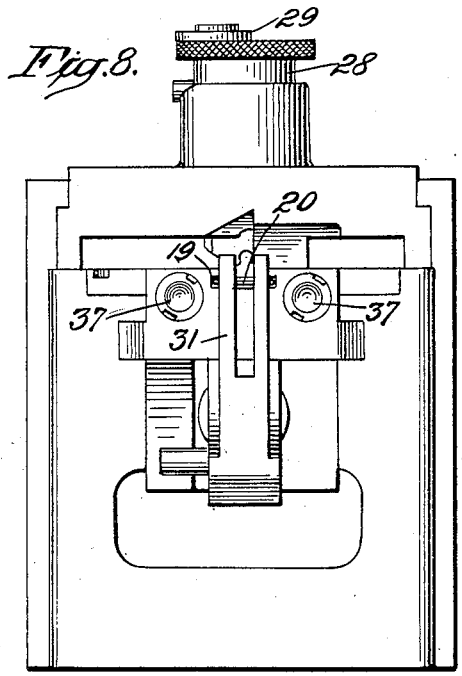
Fig. 8.
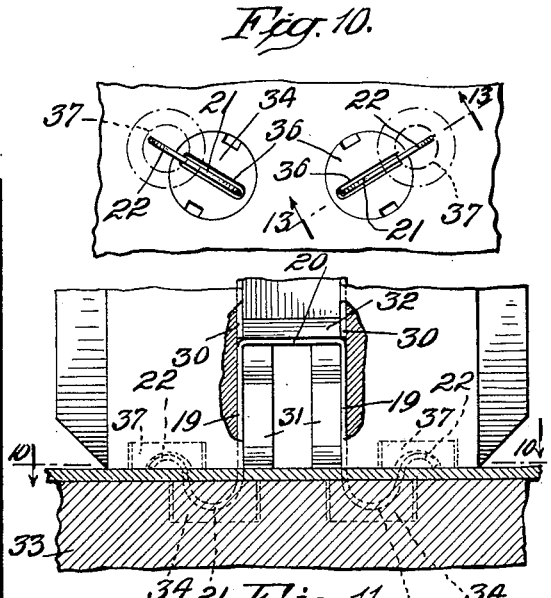
Fig. 10.
Fig. 11.
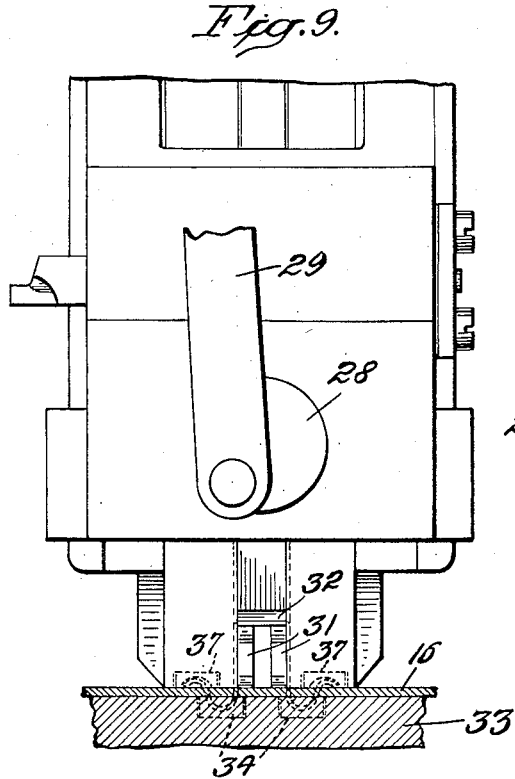
Fig. 9.
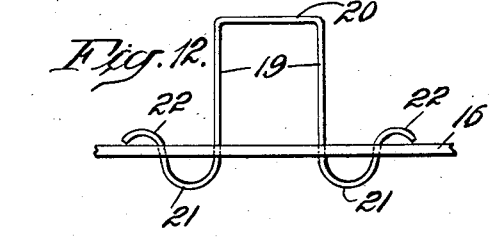
Fig. 12.
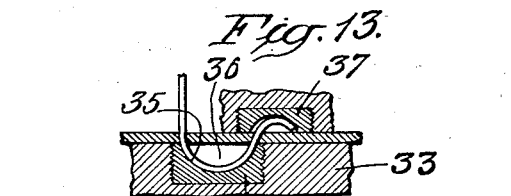
Fig. 13.
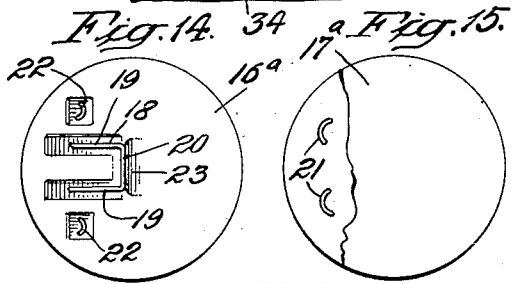
Fig. 14.   Fig. 15.
INVENTORS
Frank O'Neill, Jr. & Arthur R. Burns
BY
English & Studwell
ATTORNEYS Patented Sept. 19, 1933

1,927,183

UNITED STATES PATENT OFFICE 1,927,183

METHOD OF MANUFACTURING WIRE PULL BOTTLE CAPS

Frank O'Neill, Jr., New York, and Arthur R. Burns, Amityville, N. Y., assignors to The Fargo Corporation, Brooklyn, N. Y., a corporation of New York Application April 18, 1932. Serial No. 605,806

16 Claims. (Cl. 93—1)

This invention relates to a method of manufacturing paper-disk bottle caps of the kind intended for use in milk bottles and other receptacles. The particular type of bottle cap made according to the improved method of manufacture consists of a paper disk which fits snugly in the bottle neck and rests on a seat formed therein, and is provided with a wire handle or "pull" by which it may be manually withdrawn from its seat. The wire handle or "pull" consists of a single piece of wire bent to a substantially U-shape and formed with a pair of legs which extend downwardly through the cap to reach the under face thereof where they are projected laterally and then curled upwardly to pass through the cap to reach its upper face where they are curled downwardly.

The object of this invention is to provide a method by which caps of the kind described are accurately and speedily manufactured. The improved method contemplates the intermittent feeding of a continuous paper sheet or web to a wire-pull inserting mechanism by which the pulls are inserted in the sheet; the inserted pulls are then bodily pivoted in the sheet to cause them to assume an inclined or tilted position, and are then uniformly aligned or positioned in the sheet and embedded therein. The sheet carrying the embedded pulls is then adhesively united with a thinner paper lamina which extends over and wholly covers the under face of the sheet, and the laminated or two-ply sheet so formed is fed to a punch which stamps the completed caps from it.

In the accompanying drawings, Fig. 1 is a diagrammatic view of mechanism for making caps in accordance with the method of this invention; Fig. 2 is a plan view of the means for inclining or tilting the wire pulls relative to the sheet after the pulls have been inserted; Fig. 3 is a sectional view on the line 3—3 of Fig. 2, looking in the direction of the arrows; Fig. 4 is a view from below the die means which positions and then embeds the wire pulls in the sheet; Fig. 5 is a sectional view on the line 5—5 of Fig. 4, looking in the direction of the arrows; Fig. 6 is a sectional view on the line 6—6 of Fig. 4, looking in the direction of the arrows; Fig. 7 is a plan view of the plunger which carries the embedding mechanism, showing a portion of the paper sheet located below it; Fig. 8 is a view from below one of the devices which inserts the wire pulls in the sheets; Fig. 9 is a front view, with parts in section, of the mechanism shown in Fig. 8; Fig. 10 is a sectional view on the line 10—10 of Fig. 11, looking in the direction of the arrows, Fig. 11 is a front elevation, with parts in section of a portion of the pull-inserting mechanism, showing how the pulls are formed and inserted in the upper layer of the laminated sheet from which the caps are subsequently stamped; Fig. 12 shows one of the pulls after it has been inserted in the sheet; Fig. 13 is a sectional view on the line 13—13 of Fig. 10, looking in the direction of the arrows; Fig. 14 is a plan view of the finished cap, and Fig. 15 is a view of the under face of the cap, with the lower lamina broken away to disclose the position and shape of the parts of the pull located on the under face of the upper layer.

The cap manufactured in accordance with the method of this invention is shown in Figs. 14 and 15. It consists of a laminated disk composed of an upper and thicker paper layer 16a adhesively united with a lower, thinner layer 17a. A wire pull member 18 is inserted and embedded in the disk. On the top face of the disk is disposed a substantially U-shaped portion of the wire pull, that portion being composed of a pair of legs 19 connected by an integral cross member 20. The legs 19 pass through the disk to the under side of the layer 16a where they extend laterally at 21 and are curled upwardly to again pass through the layer 16a to the upper side thereof where they terminate in the curved end portions 22. The parts 19, 20 and 22 are located on the upper face of the disk where they are embedded. To enable the handle portion of the pull, consisting of the parts 19 and 20, to be easily raised and grasped to lift the cap from a bottle, an indentation or finger depression 23 is formed in the upper face of the disk adjacent to the cross bar 20 of the pull. The curled portions 21 of the pull are disposed on the under face of the layer 16a where they are embedded and are covered by the paper lower layer of lamina 17a. The under surface of the disk is therefore imperforate, since the layer 17a covers the minute holes formed in the layer 16 by the passing of the parts of the wire pull through it. No portions of the wire are in contact with the bottle contents since the parts 21 of the pull are fully covered and concealed by the layer 17a.

The caps are formed by being stamped from a laminated paper sheet after the wire pulls have been inserted.

The method of producing the caps is disclosed in Fig. 1 wherein a sheet 16 which forms the layer 16a in the finished cap, is shown in position in the apparatus, where the several mechanisms which produce the caps operate upon it. The sheet 16 is defined, by printing or otherwise, with a plurality of cap outlines 25, and is provided along its longitudinal edges with spaced holes 26 which are engaged by pilot pins to register and hold the sheet securely during the pauses in its intermittent travel.

For inserting the wire pulls 18 in the sheet 16 a mechanism indicated at 27 is provided. It consists of a number or gang of "wire-stitching" devices of a construction well-known in the stapling art, but modifid to insert pulls of the form shown in Fig. 12. A number of these stitching machines are grouped together in such a manner as to simultaneously insert a number of the pulls in the sheet 16. A part of one of the pull-inserting devices is shown in Figs. 8 to 11 inclusive. Since the general structure of this type of machine is well-known, a detailed description of it is deemed unnecessary. In wire-stapling devices of this character, the wire for forming the pulls is usually fed from a roll located above the stitching head. The wire so fed is twisted at right angles by means of a twisting member 28 operated from a link 29. A section of the wire is severed and the legs 19 of each pull are formed by the descent of slides 30 which bend the wire over an anvil 31. The wire, then in substantially U-shape, is forced downward by the plunger 32, the ends of the legs 19 penetrating the sheet 16. The base 33 upon which the sheet 16 rests is provided with wire-shaping members 34 which are slotted at 36, the slots having curved surfaces 35. When the legs 19 pierce the sheet 16 they are forced into the slots 36 and are directed laterally thereby to form the curved parts 21 of the pull. The curved surfaces 35 direct the legs upwardly as shown in Fig. 13 until they pass through the sheet 16 where they enter into shaping members 37 which curl them downwardly and form the parts 22 of the pull.

While the operation of inserting the wire pulls is taking place, the sheet 16 is held stationary by being gripped between the base 33 and parts of the wire-inserting devices. The pilot pins 38 enter into some of the holes 26 provided in the sheet and properly position the sheet as well as prevent it from longitudinal shifting during the operation of inserting the pulls. These pins 38 are located in a plate 39 attached to the base 33. After each pull-insertion the base 33 descends to the position shown in Fig. 1, its descent serving to lower the pins 38 out of the holes in the sheet, permitting the sheet to be shifted longitudinally to present a new portion to the pull-inserting means. The base 33 is then carried upward by its vertical shaft 39, for the next pull-inserting operation. Upon its upward movement the base 33 brings a pair of inclined surfaces 40, with which it is provided, into contact with the under parts 21 of each wire pull whereby the wire pulls which have just been inserted are bodily swung or pivoted relative to the sheet 16 to cause them to assume the tilted or inclined position shown in Figs. 1 and 5.

When the base 33 descends and frees the sheet from its engagement with the pins 38, the sheet is longitudinally shifted. This can be done by any suitable intermittent feed means such as is shown in Fig. 1. The feed means there shown is provided with a lower roller 40, connected by a clutch to an arm 41 which connects to a lever 42 operated by a suitable cam mechanism, not shown. The roller 40 carries knurled end portions 43 which cooperate with similar knurled rollers 44 provided on an upper roller 45. This upper roller 45 is mounted in bearings 46 and is resiliently directed toward the lower roller 40 by means of coil springs 47 located at its opposite ends. The knurled portions 43 and 44 resiliently grip the sheet and move it with an intermittent movement.

The part of the sheet 16 in which the wire pulls have been inserted and inclined is next brought to the embedding means shown at 50. Here the inserted wire pulls are aligned and positioned in the sheet and then embedded. The details of the aligning and embedding mechanism are shown in Figs. 4 to 7 inclusive. As the sheet 16 passes from the pull-inserting mechanism it is carried over a support 48. Located above the sheet 16 and over the support 48 is a plunger 49 which carries the mechanism for aligning and positioning the wire pulls and embedding them in the sheet. The plunger consists of a plate carried on a supporting rod 51 and vertically reciprocated on guide rods 52, shown in Fig. 7. An eccentric or other suitable mechanism is used for vertically reciprocating the plunger. Secured to the plunger by an angle bracket 53 is a plate 54 which is provided near its opposite edges with a number of downwardly projecting pilot pins 55. Upon the descent of the plunger 49 the pins pass through some of the holes 26 in the sheet 16 and register the sheet with respect to the plunger mechanism. Channelled members 56 guide the edges of the sheet 16, these members being perforated at 57 to receive the pins 55 when the plunger 49 descends.

Secured to the under side of the plunger 49 is a plate 58 which is provided with a number of grooves 59. Each of these grooves accommodates a disk-like die member 60, these die members being slidingly mounted in the grooves and being adapted to be shifted therein to the left of Figs. 1 and 5 against the pressure of springs 61. The walls of the grooves 59 are formed with inclined surfaces 62 which cooperate with correspondingly formed grooves in the sides of the dies 60 to positively guide the dies in their sliding movement.

The dies 60 are slidingly shifted on their support by a frame composed of a longitudinal bar 63 and end bars 64 and 65, the end bars being connected to the bar 63 by the screws 66. The longitudinal bar is movably connected to the plate 58 by screws 67 which are threaded into the plate 58 and extend through slots 68 in the bar 63. Threaded in the bar 63 is a plurality of rods 69, each of these rods being adapted to slidingly shift one of the dies 60. Each rod is formed with a shoulder 70 which bears against the end of a bushing 71, the opposite end of which is held against the face of a die member 60, as shown in Fig. 5. The inner end of the rod 69 is accommodated in a recess 72 provided in the die member. Through the adjustable rods 69 and cooperating bushings 71 the position of each of the die members relative to the frame which slides these members, may be regulated. A lock nut 73 on each rod holds it in its proper position of adjustment when that has been secured.

The die-shifting frame composed of the connected bars 63, 64 and 65 is slidingly shifted relative to the plunger 49 by means of cam surfaces, two of which are shown at 74 on members 75 secured by screws 76 at the opposite sides of the support 48. These fixed cam surfaces cooperate with movable cam surfaces 77 formed on the end of each of the bars 64 and 65. When the plunger 49 descends, the cam surfaces 77 are brought into contact with the fixed cam surfaces 74, and the frame composed of the bars 63, 64 and 65 and associated parts, is shifted to the left of Figs. 1 and 5, or in a direction at right angles to the reciprocatory movement of the plunger 49. This sliding movement of the frame causes the die members 60 to be shifted in their grooves 59 against the pressure of the springs 61 which surround rods 78 threaded into a bar 79 attached to the edge of the plate 58. One end of each spring bears against a die member 60, the opposite end of the spring bearing against a washer 80 impinging against a shoulder formed on the rod. The inner end of each rod projects into a recess 81 formed in the die, the opposite end of each rod being threaded in the bar 79 and held in any desired position of adjustment by means of the lock nut 82.

Each die member 60 is provided with a recess 83 in which a plunger 84 is movable. At its lower end, the plunger 84 is formed with a die portion 85 which acts to align and position the wire pulls in the sheet 16 upon the sliding movement of the die 60, and also forms one of the indentations 23 in the sheet. The plunger 84 is spring-pressed by means of a coil-spring 86 which seats in a pocket 87 provided in its upper end.

During a pause in the movement of the sheet 16, the plunger 49 descends and the pins 55 carried thereby enter into some of the holes 26 in the sheet and register the sheet with respect to the plunger and hold it from shifting while the alignment and embedding of the wire pulls takes place. By the descent of the plunger 49 the cam surfaces 77 are brought into contact with the fixed cam surfaces 74 whereby the frame carrying the rods 69 is slidingly shifted to the left of Figs. 1 and 5. At the beginning of the sliding movement, the plunger has partly descended and the parts are substantially in the position shown in Fig. 5. The rods 69 and bushings 71 slide all of the die members 60 to the left of Fig. 5, this action causing the die portion 85 on each die 60 to be brought into forcible contact with one of the cross bars 20 of a wire pull whereby each wire pull is aligned or straightened in the sheet preparatory to being embedded therein. This action will be readily understood by reference to Fig. 5 where the die portion 85 there shown is about to be shifted to the left and brought into contact with the cross bar of the wire pull indicated at 88, to properly align and position this wire pull with respect to the embedding die portions 89 and 90 located on the lower surface of the die 60. These die portions 89 and 90 consist of raised surfaces which are shaped to correspond to the parts 19, 20 and 22 of the wire pull. Each die portion 89 has a slightly inclined face so that the legs 19 of the pull are more deeply embedded adjacent the points where they pass through the cap than at the cross bar. When the plunger 49 has reached its final position of descent, it will be found that the legs and cross bar of the pull have been embedded in the upper face of the sheet 16 by the pressure of the die portions 89 and 90, and the lower parts 21 have been embedded in the under face of the sheet by being pressed against the surface of the base 48. While the parts 19, 20 and 22 of the pulls are being embedded in the upper face of the sheet 16 by the pressure of the die portions 89 and 90, the indentations 23 are being formed in the top face of the sheet by the action of the lower surface of each of the die portions 85. The plunger 49 is then raised and the sheet 16 is shifted to bring the part in which the pulls have been embedded between pressing rollers 91 and 92.

A sheet forming the lower covering or lamina 17 has an adhesive applied to one of its faces by a constantly rotating roller 93 which receives the adhesive from a receptacle 94. The gummed sheet 17 is fed between the intermittently operating rollers 91 and 92 in company with the sheet 16, the two sheets 16 and 17 being thereby adhesively united, with the sheet 17 disposed over and completely covering the under face of the sheet 16.

The two sheets 16 and 17, thus adhesively united, pass between the feeding rollers 43 and 44 and are fed thereby to a punch 95. The under face of the punch is provided with disks 96, which in cooperation with apertures 97 in a base plate 98, stamp the completed disks out of the laminated sheet. A finished disk is shown in Figs. 14 and 15. The punch 95 carries a plate 99 in which a number of pins 100 are located, these pins entering the holes 26 in the sheet upon the descent of the punch as was explained in reference to the pins 55 and 38. Upon its descent, the punch brings a pin 101 carried by it, in contact with a lever 102, pivoted at 103, to cause the lever to elevate the roller 44 and prevent the same from cooperating with the roller 45 to feed the sheet while the punch 95 as well as the plunger 49 and stitching devices 27 are in their lowered or operating positions. A similar lever 110 is depressed by a pin 111 on the plate 54 so that the roller 91 is elevated on the descent of the plate.

Through the mechanism herein described, the method of making the paper-disk caps is clear. A plurality of wire pulls are inserted in a sheet by the devices 27; the pulls are bodily pivoted in the sheet by the surfaces 40 to cause them to assume a tilted or inclined position; they are struck by aligning means 85 to position them in the sheet and are then embedded in the sheet by the die portions 89 and 90, and indentations 23 are formed by the members 85. The sheet carrying the embedded pulls is then adhesively united with a lamina or lower paper layer, which covers the under face of the sheet, and the laminated web thus produced is stamped into the disk-like caps.

What we claim is:—

1. In the method of making bottle caps, the steps of passing the leg portions of a U-shaped wire pull through a paper sheet, curling the inserted leg portions upwardly on the under side of the sheet to cause them to again pass through the sheet to reach the upper side thereof, directing the ends of the leg portions toward the top face of the sheet, tilting the entire pull bodily in the sheet and embedding parts of the pull in the opposite faces of the sheet.

2. In the method of making bottle caps, the steps of intermittently feeding a paper sheet in which a plurality of caps is defined, the caps being arranged in rows extending transversely across the sheet, passing the leg portions of a U-shaped wire pull through each of the caps as defined in the sheet during a pause in the intermittent movement of the sheet, curling the inserted leg portions upwardly on the under side of the sheet to cause them to again pass through the sheet to reach the upper side thereof, directing the ends of the leg portions toward the top face of the sheet, inclining the entire pull bodily in the sheet and embedding parts of the pull in the opposite faces of the sheet.

3. In the method of making bottle caps, the steps of intermittently moving a paper sheet, inserting a plurality of wire pulls in the sheet during a pause in its movement, inclining the inserted pulls by tilting them bodily in the sheet, embedding handle portions of the pulls in the top face of the sheet, and forming depressions in the top face of the sheet adjacent to the handle portions of the pulls simultaneously with the embedding of the handle portions.

4. In the method of making bottle caps the steps of passing the leg portions of a U-shaped wire pull through a paper sheet, curling the inserted leg portions upwardly on the under side of the sheet to cause them to again pass through the sheet to reach the upper side thereof, directing the ends of the leg portions toward the top face of the sheet, embedding tilting the entire wire pull bodily in the sheet to bring the under portions of the pull toward the under face of the sheet and to bring its upper portions adjacent to the top face of the sheet parts of the pull in the opposite faces of the sheet and simultaneously forming a depression in the upper face of the sheet adjacent to a portion of the pull embedded therein.

5. In the method of making bottle caps, the steps of intermittently moving a paper sheet, passing the leg portions of a U-shaped wire pull through the sheet during a pause in its movement, curling the inserted leg portions upwardly on the under side of the sheet to cause them to again pass through the sheet to reach the upper face thereof, directing the ends of the leg portions toward the top face of the sheet, tilting the inserted pulls bodily in the sheet during a pause in the movement of the sheet, embedding parts of the pull in the opposite faces of the sheet and forming a depression simultaneously with the embedding operation, in the upper face of the sheet adjacent to a portion of the pull embedded therein.

6. The method of making paper-disk bottle caps, consisting in supporting a paper sheet, in inserting spaced wire pulls in the sheet, inclining the pulls relative to the sheet, aligning the pulls in the sheet, embedding the pulls in the sheet, and stamping disks from the sheet.

7. In the method of making paper-disk bottle caps, the steps of supporting a paper sheet, applying spaced wire pulls to the sheet by forcing the leg portions of a substantially U-shaped wire through the sheet, curving the leg portions laterally below the sheet and directing them upwardly to cause them to pass through the sheet and reach its upper face, in inclining the wire pulls relative to the sheet, in pushing the pulls lengthwise in the sheet while so inclined to align them relative to the sheet, and embedding the parts of the pulls in the opposite faces of the sheet.

8. In the method of making paper-disk bottle caps, the steps of forcing a pair of downwardly directed leg portions of a wire pull through a paper sheet, causing the leg portions to be directed laterally and curled upwardly and passed upward through the sheet, embedding the lower curled portions of the legs in the under face of the sheet and embedding the other parts of the pull in the upper face of the sheet.

9. In the method of making paper-disk bottle caps, the steps of forcing a pair of downwardly directed leg portions of a wire pull through a paper sheet, directing the leg portions laterally below the under side of the sheet, curling said lateral leg portions upwardly to cause them to pass upwardly through the sheet to reach its upper face and then curling them downwardly toward the upper face of the sheet.

10. The method of making paper-disk bottle caps, consisting in supporting a paper sheet, in inserting spaced wire pulls in the sheet, inclining the pulls relative to the sheet, striking the inclined pulls to align and position them in the sheet, embedding the pulls in the sheet, applying a paper lamina to a face of the sheet and in stamping disks from the laminated sheet.

11. The method of making paper-disk bottle caps, consisting in supporting a paper sheet, applying spaced wire pulls to the sheet by forcing the leg portions of a substantially U-shaped wire through the sheet and curving the leg portions laterally below the sheet and directing them upwardly to pass through the sheet and reach its upper face, inclining the wire pulls relative to the sheet, pushing the pulls lengthwise in the sheet while so inclined to align them relative to the sheet, embedding the parts of the pulls in the opposite faces of the sheet, applying a lamina over the under face of the sheet and in stamping caps from the laminated sheet.

12. The method of making paper-disk bottle caps, consisting in applying spaced wire pulls to a paper sheet so that parts of the pulls are disposed on opposite faces of the sheet, in tilting the pulls relative to the sheet, applying longitudinal pressure to the inclined pulls to align them in the sheet, embedding the parts of the pulls in the opposite faces of the sheet, adhesively applying a paper lamina to the bottom face of the sheet to wholly cover the same and cover the parts of the pulls disposed on said face, and stamping caps from the laminated sheet.

13. In the method of making paper-disk bottle caps, the step of supporting a paper sheet, in attaching wire pulls thereto by forcing the legs of U-shaped wire sections through the sheet, directing the legs laterally beneath the sheet and curving them upwardly to cause them to pass through the sheet to reach the upper face of the same and there directing them downwardly to the upper face of the sheet, inclining the pulls relatively to the sheet and embedding the parts of the pulls in the sheet.

14. In the method of making paper-disk bottle caps, the step of supporting a paper sheet, in attaching wire pulls thereto by forcing the legs of U-shaped wire sections through the sheet, directing the legs laterally below the sheet and curving them upwardly to cause them to pass through the sheet to reach the upper face thereof, in there directing them downwardly toward the upper face of the sheet, embedding the pulls in the opposite faces of the sheet, and applying a paper lamina over the bottom of the sheet to cover the openings in the sheet caused by the penetration of the legs of the pulls.

15. The method of making paper-disk bottle caps consisting in inserting a plurality of wire pulls in a paper sheet so that parts of the pulls project above and below the sheet, striking the portions of the pulls located below the sheet to bodily pivot the pulls and cause them to assume a tilted position with respect to the sheet, striking the inserted and inclined pulls to position and align them in the sheet, embedding parts of the pulls in the opposite faces of the sheet, adhesively affixing a paper layer to one face of the sheet and stamping disks from the laminated sheet.

16. The method of making paper-disk bottle caps, consisting in supporting and intermittently moving a single-layer paper sheet in which a plurality of bottle caps arranged in rows across the sheet is defined, in simultaneously inserting wire pulls in the caps contained in one or more rows in the sheet during a pause in the movement of the sheet, tilting the inserted pulls with respect to the sheet, aligning the pulls in the sheet, embedding portions of the pulls in the opposite faces of the sheet, impressing an indentation in the upper face of the sheet adjacent to a part of each of the pulls therein embedded, adhesively applying a paper layer to the under surface of the sheet, and stamping the caps from the two-layer sheet.

FRANK O'NEILL, Jr. [L. S.]
ARTHUR R. BURNS. [L. S.]